Feb. 8, 1949. E. A. MILLER 2,461,169
POWER TRANSMISSION BELT
Filed June 27, 1944
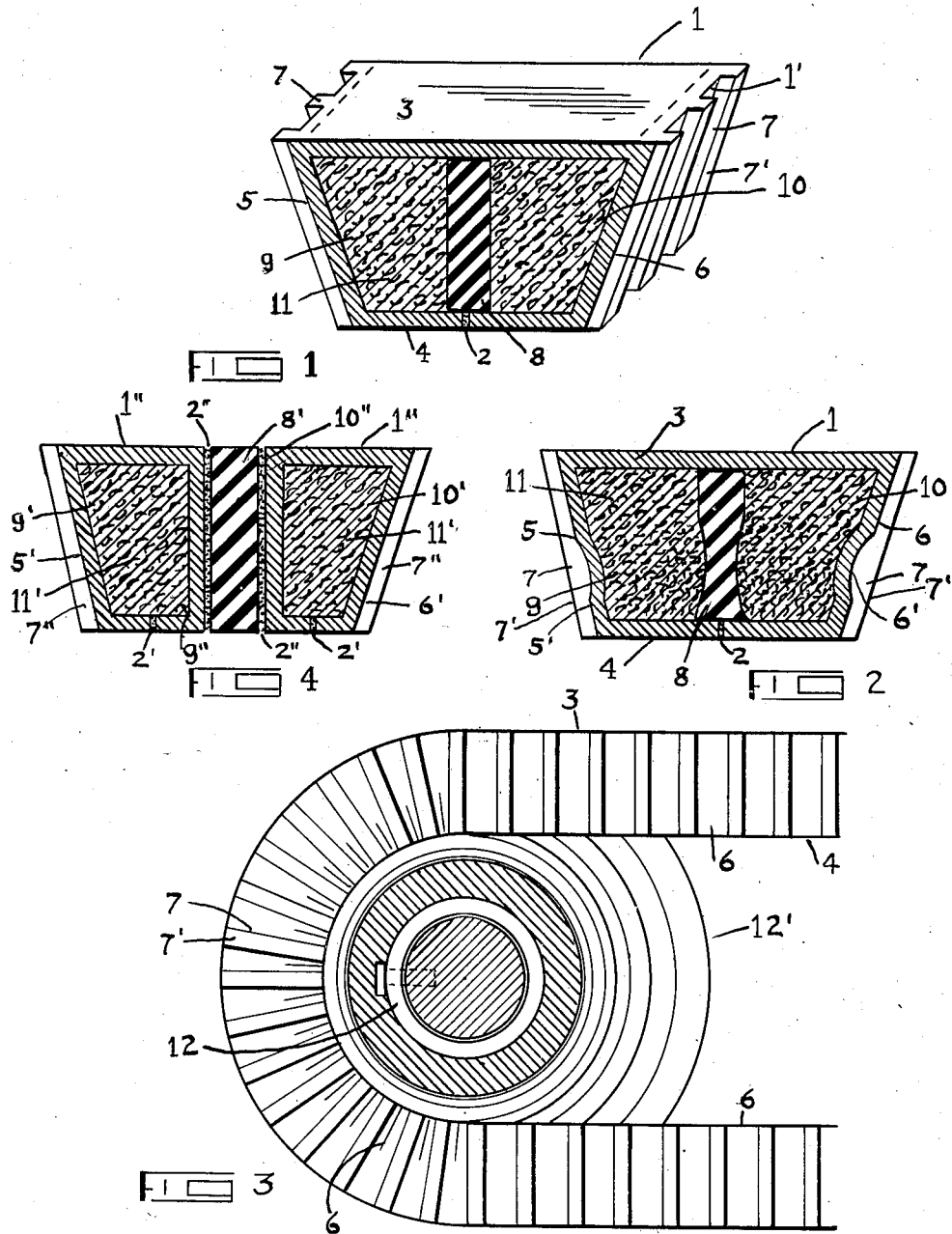
EDWIN AUGUST MILLER INVENTOR.
BY George Henry Elwell
ATTY Patented Feb. 8, 1949

2,461,169

UNITED STATES PATENT OFFICE 2,461,169

POWER TRANSMISSION BELT

Edwin August Miller, Fairfield, Conn.

Application June 27, 1944, Serial No. 542,314

2 Claims. (Cl. 74—233)

This invention relates to power transmission belts of the V-type and the object of the invention is to provide means adapted to compensate for the usual side expansion of that type of belt in its flexed relation to a pulley wheel as it passes therearound.

Another object is to provide such control of side expansion that the belt may ride the pulley wheel in a fixed circumferential path to thus maintain a steady rate of speed throughout the entire belt.

A further object is to provide the belt with cross-sectional co-operating means adapted to maintain the pulley wheel contacting surface of the belt in an evenly flexed pressure.

With reference to the accompanying drawing, Figure 1 is a perspective cross-section of a fragmentary portion of the improved belt; Figure 2 is a cross-sectional view of said belt, one of the co-operating means in contracted condition; Figure 3 is a reduced side view of a flexed portion of the belt, one rim of the pulley wheel being omitted to expose the flexed portion; and Figure 4 is a cross-sectional view of a slightly modified belt.

With more particular attention to the accompanying drawing, the numeral 1 designates the outer covering of the belt, the meeting edges of which are cemented, or otherwise relatively secured one to the other, by the adhesive 2. The upper and lower parts 3 and 4, respectively, of the covering 1 are substantially parallel, one to the other, and the outer side-surfaces 5 and 6 are relatively convergent with relation to the upper part 3, the covering 1 thus assuming a cross-section of trapezoidal form. Each of the side-surfaces 5 and 6 is integrally provided with the external, relatively spaced and outstanding ribs 7, said ribs 7 each having a flat contacting surface 7' throughout its length. Between each of the ribs 7 is an elongated recess 1' of which the side-surfaces 5 and 6 provide bases therefor.

Vertically positioned with relation to the belt interior are one or more blocked-shaped strips 8 extending continuously, or in sections, the entire belt structure, said strips 8 comprising some form of flexible material, such as rubber. Between such strips 8 and the inner side surfaces of said covering 1 there is inserted or positioned a suitable packing 11 filling the compartments 9 and 10 thus established as when a single strip 8 is centrally positioned as illustrated by the Figure 1, said packing 11 being of fluid character.

Either one or the other of the flexible strip 8 or the outstanding ribs 7, may be omitted in the construction of the improved belt, if desired, but where both are included they together provide co-operating facilities for fully counteracting the ordinary flexed condition of the V-type belt.

In operation, where the fully improved belt is installed, for instance, connecting a power pulley wheel 12 and transmitting power thereby to an auxiliary pulley wheel, not illustrated, some portion of the belt is always in flexed condition as the belt passes over either wheel, as illustrated by the Figure 3 with relation to the wheel 12, thus maintaining the outer convergent side-surfaces 5 and 6, adjacent the upper part 3 in a normal flat condition, while the lower outer side-surfaces 5' and 6', carried by the lower part 4, becomes puckered, thus cramping adjacent portions of the packing 11 within the covering 1, which packing 11 thereby forced in directions of the least resistance, namely against the flexible strip 8 and the recesses 1', both of which yield to such force, as illustrated by the Figure 2 with relation to the flexible strip 8. The yielding of such force at the recesses 1' causes an expansion outwardly thereat, but not exceeding beyond the projection of the ribs 7 so that the outer face 7' of the ribs 7 maintains an unchanged even pressure-contact with the V-walled surface of the rim 12' of the wheel 12 throughout its passage over the wheel 12. This is true with regard to the lower side-surfaces 5' and 6' even though the flexible strip 8 is omitted in the construction of the improved belt, although with greater stress upon the recessed portions. Where the ribs 7 are omitted in the construction of the improved belt, the flexed force seeks the course of the least resistance, the strip 8 yielding as such force is communicated through the flexible packing 11, while the contacting portions of the outer side-surfaces 5 and 6 maintain a steady frictional grip upon the V-walled surface of the rim 12' of the wheel 12.

The Figure 4 illustrates a slight modification in which the vertical flexible strip 8' extends longitudinally between companion parts of the belt structure, thereby establishing two compartments 9' and 10', each having its covering 1" the meeting edges of which coverings being secured, one to the other, by adhesive element 2', and each compartment 9' and 10' secured to and upon opposite sides of the flexible strip 8' by means of the adhesive element 2" applied to both the strip 8' and also to the adjoining inner side-surfaces 9" and 10" of said compartments 9' and 10'.

This modification is illustrated as being provided with outstanding ribs 7", as in the preferred form, but such ribs 7" may be omitted if desired.

The operation of the modified form of belt is substantially identical with that of the preferred form, the flexible strip 8' being adapted to yield laterally to external pressure displacing the lower portions of the convergent sides and also the packing upon a flexed condition of said belt.

I claim:

1. A power transmission belt of V-type comprising a top portion extending throughout the length of the belt and defining the outer circumference of a flexed belt portion; a base belt portion of lesser width than that of the top portion and defining the inner circumference of said flexed belt portion; converging side portions connecting said top and base portions; a flexible member of block rubber, or the like, centrally connecting said top and base portions; and a suitable fluid material between said block rubber member and said top and converging side portions, the slight lateral yielding of said fluid material, the particles of which move without separating the mass, is substantially resisted by said centrally positioned flexible member.

2. A power transmission belt of V-type, the combination of a flexible member of block rubber, or the like, centrally connecting the top and base portions of a belt and having upon either side thereof a suitable fluid material within converging sides of said belt; and spaced outstanding ribs with which said converging sides are exteriorly provided, said flexible member and said ribs being adapted to co-operate in resisting lateral pressure contact of a flexed belt.

EDWIN AUGUST MILLER.

REFERENCES CITED

The following references are of record in the file of this patent:

UNITED STATES PATENTS

| Number | Name | Date |
|---|---|---|
| 859,197 | Byrom | July 9, 1907 |
| 1,435,566 | Vanderley et al. | Nov. 14, 1922 |
| 1,792,921 | Newhouse | Feb. 17, 1931 |
| 1,964,510 | Goetter | June 26, 1934 |
| 2,173,340 | Myers | Sept. 19, 1939 |

FOREIGN PATENTS

| Number | Country | Date |
|---|---|---|
| 24,370 | Great Britain (1913) | Aug. 7, 1914 |
| 230,219 | Great Britain | Mar. 12, 1925 |